(12) United States Patent
Lai et al.

(10) Patent No.: US 7,974,016 B2
(45) Date of Patent: Jul. 5, 2011

(54) FIXED FOCUS LENS

(75) Inventors: Sheng-Tang Lai, Hsinchu (TW);
Kuo-Chuan Wang, Hsinchu (TW);
Jung-Yao Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/572,902

(22) Filed: Oct. 2, 2009

(65) Prior Publication Data

US 2010/0097710 A1    Apr. 22, 2010

(30) Foreign Application Priority Data

Oct. 22, 2008  (TW) ............................. 97140383 A
Jan. 9, 2009   (TW) ............................. 98100564 A

(51) Int. Cl.
*G02B 9/34*      (2006.01)
*G02B 13/18*     (2006.01)
(52) U.S. Cl. .................... 359/773; 359/715; 359/772
(58) Field of Classification Search .................. 359/773, 359/774, 715, 772
See application file for complete search history.

(56) References Cited

U.S. PATENT DOCUMENTS

| 7,079,330 | B2 | 7/2006 | Lee et al. |
| 7,274,518 | B1 | 9/2007 | Tang et al. |
| 7,321,474 | B1 | 1/2008 | Jo |
| 7,755,854 | B2 * | 7/2010 | Sano ............................. 359/773 |
| 2007/0188891 | A1 | 8/2007 | Shinohara |

FOREIGN PATENT DOCUMENTS

CN           1737635           2/2006

* cited by examiner

*Primary Examiner* — Scott J Sugarman
(74) *Attorney, Agent, or Firm* — Muncy, Geissler, Olds & Lowe, PLLC

(57) ABSTRACT

A fixed focus lens includes, numbered in order of location from an object side to an image side, a first lens, a second lens, a third lens, and a fourth lens. The first lens is a biconvex lens with a positive refractive power, and the second lens is a convex-concave lens with a negative refractive power. The third lens is a concave-convex lens with a positive refractive power, and the fourth lens is an aspherical lens having a negative refractive power in the centre portion thereof and a positive refractive power at the periphery portion thereof. The fixed focus lens satisfies the condition: $1.0 > |(1/r_2 - 1/r_1)| > 0.6$, where $r_1$ denotes the radius of curvature of a front surface of the second lens and $r_2$ denotes the radius of curvature of a rear surface of the first lens.

10 Claims, 5 Drawing Sheets

US 7,974,016 B2

FIXED FOCUS LENS

CROSS REFERENCE TO RELATED APPLICATION

This application claims priority of application No. 097140383 filed on Oct. 22, 2008 and application No. 098100564 filed on Jan. 9, 2009 in Taiwan R.O.C. under 35 U.S.C.§119; the entire contents of which are hereby incorporated by reference.

BACKGROUND OF THE INVENTION

1. Field of the Invention

The invention relates to an optical lens, particularly to a fixed focus lens.

2. Description of the Related Art

Recently, mobile phones with digital cameras have been widely distributed, and a four-piece photographic lens is commonly used in a digital camera having high image quality of 5 million pixels or more. The four-piece photographic lens includes, numbered in order of location from an object side to an image side, a first lens to a fourth lens. The first lens to the fourth lens have a positive, a negative, a positive, and a positive refractive power respectively, or the first lens to the fourth lens have a positive, a negative, a positive, and a negative refractive power respectively. The second lens, the third lens, and the fourth lens are aspherical lenses made of plastic, and the first lens is an aspherical lens made of molding glass or plastic.

FIG. 1 shows a schematic diagram illustrating a conventional fixed focus lens 100. Referring to FIG. 1, the fixed focus lens 100 includes, numbered in order of location from an object side to an image side, a first lens 110 with a positive refractive power, a second lens 112 with a negative refractive power, a third lens 114 with a positive refractive power, and a fourth lens 116 with a negative refractive power. Light beams filtered by an infrared filter 118 form an image on an image plane 120. Since the first lens 110 has a comparatively large refractive power, the total length of the fixed focus lens 100 is allowed to be reduced. However, the total length is not allowed to be further reduced because of the large interval between each two adjacent lenses. Besides, the radius of curvature of a rear surface R2 of the first lens 110 is substantially equal to the radius of curvature of a front surface R1 of the second lens 112. This results in a high tolerance of eccentricity and low assembly yield.

FIG. 2 shows a schematic diagram illustrating another conventional fixed focus lens 200. Referring to FIG. 2, the fixed focus lens 200 includes, numbered in order of location from an object side to an image side, a first lens 210, a second lens 212, a third lens 214, and a fourth lens 216. The fixed focus lens 200 has restricted field of view, and the radius of curvature of a rear surface R2 of the second lens 212 is considerably small to effectively increase relative luminance. However, such configuration results in a considerably long total length of the fixed focus lens 200 to fail to provide a light, thin, short, and small micro lens. Also, since the interval between a shoulder part of the first lens 210 and a shoulder part of the second lens 212 is considerably small, the assembly of the fixed focus lens 200 is sensitive to the tolerance of eccentricity to make mass production difficult. On the other hand, in case the interval between two shoulder parts are increased to alleviate the influence of the eccentricity tolerance, the total length of the fixed focus lens 200 is also increased, and, in turn, it is much more difficult to reduce the total length of the fixed focus lens 200.

BRIEF SUMMARY OF THE INVENTION

The invention provides a fixed focus lens, and the fixed focus lens may overcome disadvantages of conventional designs.

According to the above embodiments, a fixed focus lens includes, numbered in order of location from an object side to an image side, a first lens, a second lens, a third lens, and a fourth lens. The first lens is a biconvex lens with a positive refractive power, and the second lens is a convex-concave lens with a negative refractive power. The third lens is a concave-convex lens with a positive refractive power, and the fourth lens is an aspherical lens having a negative refractive power in the centre portion of the fourth lens and a positive refractive power at the periphery portion of the fourth lens. The fixed focus lens satisfies the condition: $1.0 > |(1/r2 - 1/r1)| > 0.6$, where $r1$ denotes the radius of curvature of a front surface of the second lens facing the object side and $r2$ denotes the radius of curvature of a rear surface of the first lens facing the image side.

In one embodiment, the fixed focus lens satisfies the condition: $0.45 > BFL/TTL > 0.35$, where BFL denotes the back focal length, the BFL is a distance from a rear surface of the fourth lens to an image plane at the image side, and TTL denotes the total length of the fixed focus lens.

In one embodiment, the fixed focus lens satisfies the condition: $f1/f > 0.65$, where $f1$ denotes the focal length of the first lens and $f$ denotes the focal length of the fixed focus lens.

In one embodiment, the first lens is made of plastic or glass, and each of the second lens, the third lens, and the fourth lens is made of plastic.

In one embodiment, each of the first lens, the second lens, and the third lens is an aspherical lens.

Compared with conventional designs, the fixed focus lens according to the above embodiments is allowed to be light, thin, short, and small and has better endurance to the tolerance of eccentricity, and thus such configuration is suitable for mass production and achieves a high assembly yield.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 4 shows a transverse ray fan plot, FIG. 5 illustrates an astigmatic field curvature, and FIG. 6 illustrates a percent distortion of the fixed focus lens.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
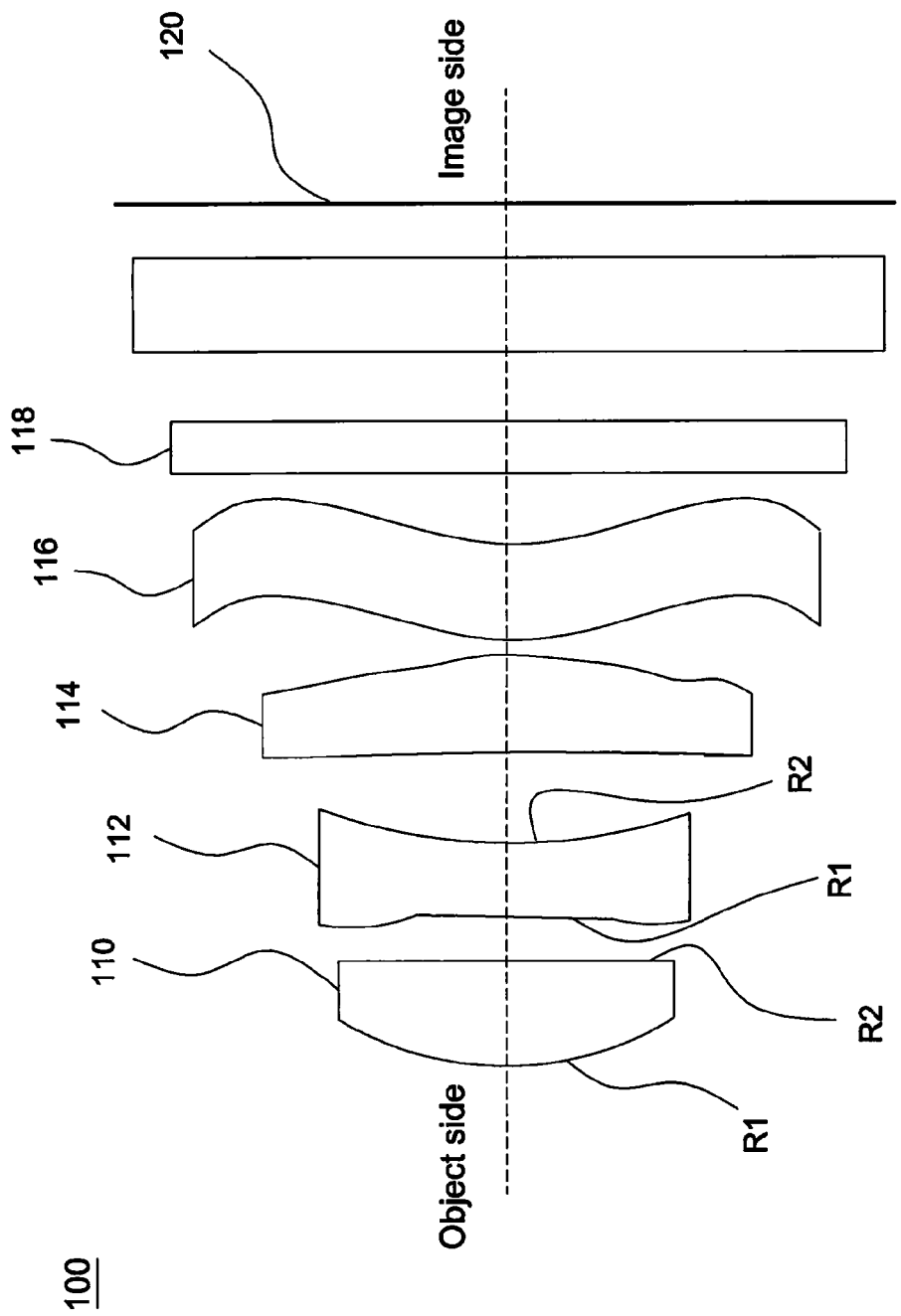
FIG. 1 shows a schematic diagram illustrating a conventional fixed focus lens.
Figure 2:
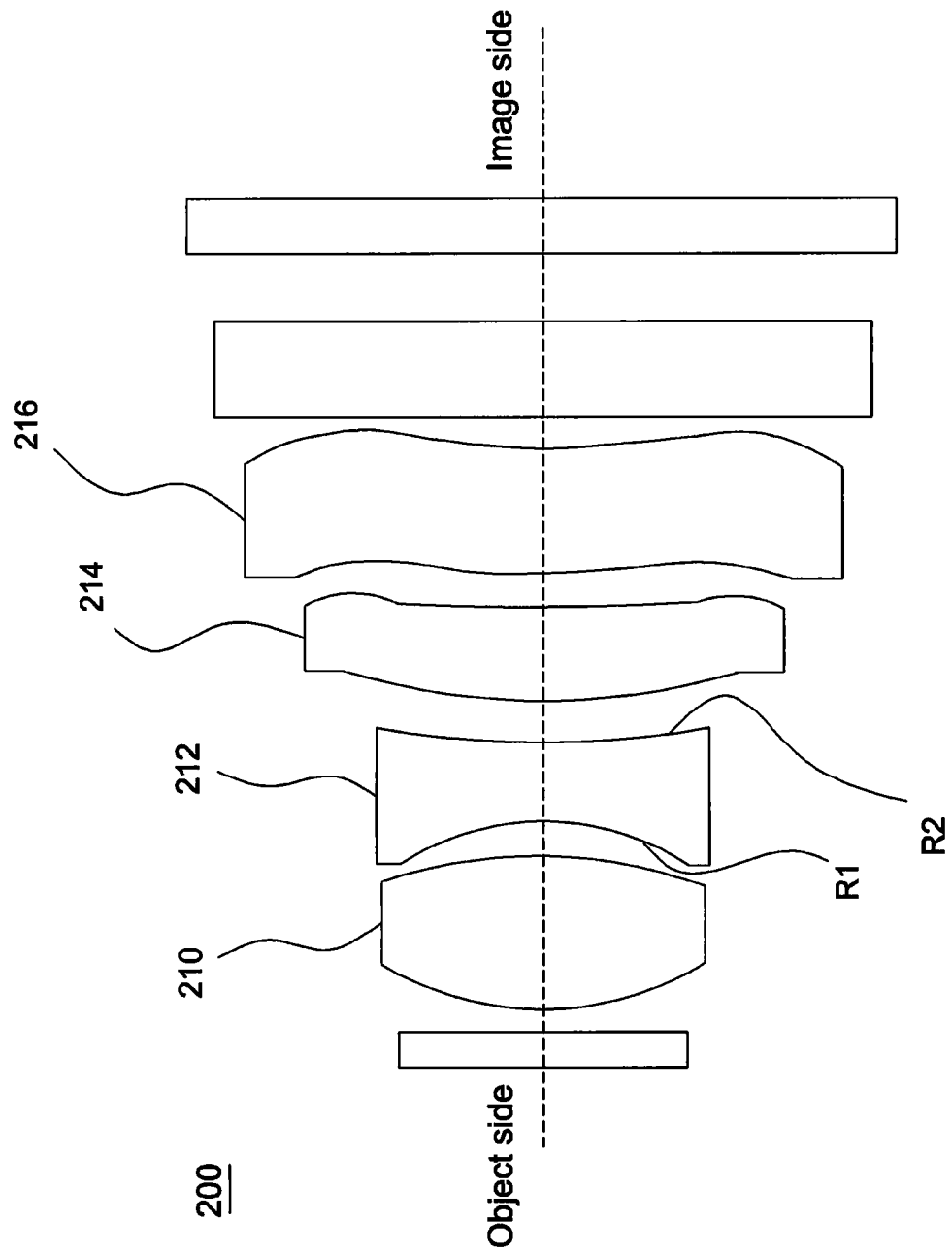
FIG. 2 shows a schematic diagram illustrating another conventional fixed focus lens.
Figure 3:
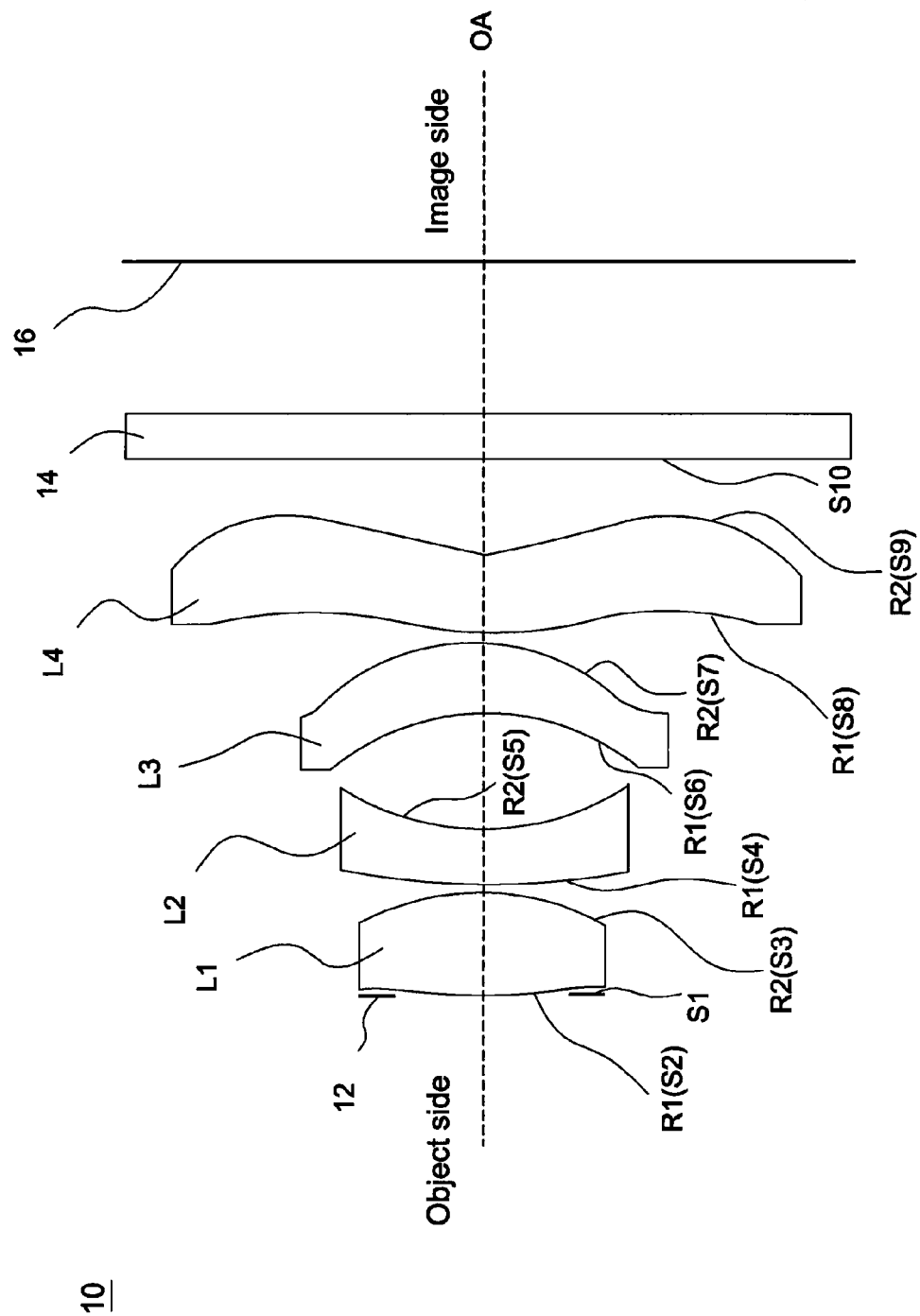
FIG. 3 shows a schematic diagram illustrating a fixed focus lens according to an embodiment of the invention.

FIG. 3 shows a schematic diagram illustrating a fixed focus lens 10 according to an embodiment of the invention. The fixed focus lens 10 is disposed between an object side and an image side, the image side is provided with an image plane 16, and the image plane 16 may be formed by a light-sensing device such as a charge-coupled device (CCD) image sensor or a complementary metal-oxide semiconductor (CMOS) image sensor.

Referring to FIG. 3, the fixed focus lens 10 includes, numbered in order of location from the object side to the image side, a first lens L1, a second lens L2, a third lens L3, and a fourth lens L4. The first lens L1 is a biconvex lens with a positive refractive power, the second lens L2 is a convex-concave (negative meniscus) lens with a negative refractive power, and the third lens L3 is a concave-convex (positive meniscus) lens with a positive refractive power. The fourth lens L4 is an aspherical lens having a negative refractive power in the centre portion of the fourth lens (neighboring an optical axis OA) and a positive refractive power at the periphery portion of the fourth lens (two sides far from the optical axis OA). Also, in this embodiment, each of the first lens L1, the second lens L2, and the third lens L3 may be an aspherical lens. Note that the term "front surface R1" used herein and in the appended claims means the surface of a lens facing the object side, and that the term "rear surface R2" means the surface of a lens facing the image side. In order to alleviate the sensitivity to the tolerance of eccentricity during assembly, the fixed focus lens 10 according to one embodiment satisfies the following condition:

$$1.0 > |(1/r2 - 1/r1)| > 0.6,$$

where r2 is the radius of curvature of a rear surface R2 of the first lens L1, and r1 is the radius of curvature of a front surface R1 of the second lens L2. In the above expression, a larger absolute value of $(1/r2-1/r1)$ indicates lower sensitivity (higher endurance) to the tolerance of eccentricity in the positioning of the first lens L1 and the second lens L2.

Further, in one embodiment, a first lens L1 having a high refractive power is used to reduce the total length of the fixed focus lens, and a second lens L2 having a proper coefficient of dispersion and refractive power is used to cooperate with the first lens L1 to correct aberration. Hence, the fixed focus lens 10 according to one embodiment satisfies the following condition:

$$f1/f > 0.65,$$

where f1 denotes the focal length of the first lens L1 and f denotes the focal length of the fixed focus lens 10.

Further, the fixed focus lens 10 according to one embodiment satisfies the following condition:

$$0.45 > BFL/TTL > 0.35,$$

where BFL denotes the back focal length (a distance from a rear surface R2 of the fourth lens L4 to the image plane 16 at the image side), and TTL denotes the total length of the entire fixed focus lens 10.

When the value of f1/f becomes larger, the total length of the fixed focus lens 10 becomes shorter but the correction to aberration becomes weaker. Further, when the value of BFL/TTL becomes larger, an outer diameter of the fourth lens L4 becomes smaller, and thus a small-sized lens barrel and a small-sized auto-focusing device are suitable for the fixed focus lens 10. Hence, according to the above embodiments, the fixed focus lens 10 has at least the advantages of a short total length and small occupied space. For example, in case a ⅓.2" CMOS photo sensor is used, the total length of the fixed focus lens 10 is kept within 5.0 mm, and the outer diameter of the fourth lens L4 is allowed to shrink to match an M6 lens barrel. Further, compared with conventional designs, the fixed focus lens 10 has better endurance to the tolerance of eccentricity during assembly. Hence, compared with conventional designs, the fixed focus lens 10 is allowed to be light, thin, short, and small and has better endurance to the tolerance of eccentricity, and thus such configuration is suitable for mass production and achieves a high assembly yield.

In one embodiment, the first lens L1 is made of plastic or glass, and the second lens L2, third lens L3, and fourth lens L4 are made of plastic. Besides, the radius of curvature of the rear surface R2 of the first lens L1 facing the image side is smaller than the radius of curvature of the front surface R1 of the first lens L1 facing the object side.

Typically, the fixed focus lens 10 may also include an aperture stop 12, and the aperture stop 12 is disposed between the object side and the first lens L1. Further, the fixed focus lens 10 may further include an infrared filter (IR) 14, and the infrared filter 14 is disposed between the fourth lens L4 and the image plane 16.

A design example of the fixed focus lens 10 is described in detail below. Note the parameters listed in Table 1 are only for exemplified purposes but do not limit the invention. It should be appreciated that variations about the design parameters or setting may be made in the embodiments by persons skilled in the art without departing from the scope of the invention.

TABLE 1

| Surface | radius of curvature (mm) | interval (mm) | refractive index | Abbe number |
|---|---|---|---|---|
| S1 (aperture stop) | ∞ | 0.02 | — | — |
| S2 | 3.22 | 0.7 | 1.515 | 63.6 |

TABLE 1-continued

| Surface | radius of curvature (mm) | interval (mm) | refractive index | Abbe number |
|---|---|---|---|---|
| S3 | −2.13 | 0.05 | | |
| S4 | 4.6 | 0.4 | 1.632 | 23.4 |
| S5 | 1.73 | 0.75 | | |
| S6 | −1.03 | 0.49 | 1.525 | 56.2 |
| S7 | −0.89 | 0.06 | | |
| S8 | 1.79 | 0.56 | 1.525 | 56.2 |
| S9 | 1.1 | 0.63 | | |
| S10 (IR) | ∞ | 0.3 | 1.517 | 64.2 |

In Table 1, an interval is defined as a linear distance between two lens surfaces along the optical axis OA. For example, an interval in relation to the surface S1 indicates a linear distance between the surface S1 and the surface S2 along the optical axis OA. Besides, surfaces S2 and S3 are two opposite surfaces of the first lens L1, surfaces S4 and S5 are two opposite surfaces of the second lens L2, surfaces S6 and S7 are two opposite surfaces of the third lens L3, and surfaces S8 and S9 are two opposite surfaces of the fourth lens L4.

In addition, according to an embodiment of the invention, each of the surfaces S2-S9 is an aspherical surface that satisfies the following Equation:

$$x = \frac{c'y^2}{1+\sqrt{1-(1+k)c'^2y^2}} + Ay^4 + By^6 + Cy^8 + Dy^{10} + Ey^{12} + Fy^{14}\ldots$$

where x denotes a displacement from the vertex of a lens in the direction of the optical axis OA, c' denotes a reciprocal of the radius of curvature at the vertex of a lens (approaching the optical axis OA), K denotes a Conic constant, y denotes a height (distance in the direction perpendicular to the optical axis OA) of the aspherical surface, and A, B, C, D, E, and F are aspheric coefficients. The values of aspheric coefficients and Conic constant of each of the surfaces S2-S9 are listed in Table 2.

TABLE 2

| surface | K | A | B | C | D | E | F |
|---|---|---|---|---|---|---|---|
| S2 | −24 | −0.04458 | 0.052449 | −0.47809 | 0.795715 | −1.41644 | 1.328952 |
| S3 | −0.16 | −0.11605 | 0.081912 | −0.20224 | 0.301394 | −0.24177 | 0.019823 |
| S4 | −106 | 0.033189 | −0.04049 | 0.10122 | 0.005141 | −0.04308 | −0.00956 |
| S5 | 0.04 | −0.03956 | −0.01768 | 0.069187 | −0.04504 | 0.058038 | −0.0456 |
| S6 | −4.8 | −0.1605 | 0.13024 | 0.021009 | −0.04462 | 0.016977 | −0.00028 |
| S7 | −2.9 | −0.12311 | 0.073594 | 0.008079 | 0.009181 | −0.00369 | −0.00111 |
| S8 | −9.5 | −0.08519 | 0.031995 | −0.00626 | −0.00052 | 0.000431 | −4.76E−05 |
| S9 | −7 | −0.07875 | 0.028392 | −0.00941 | 0.001919 | −0.00024 | 1.28E−05 |

Figure 4:
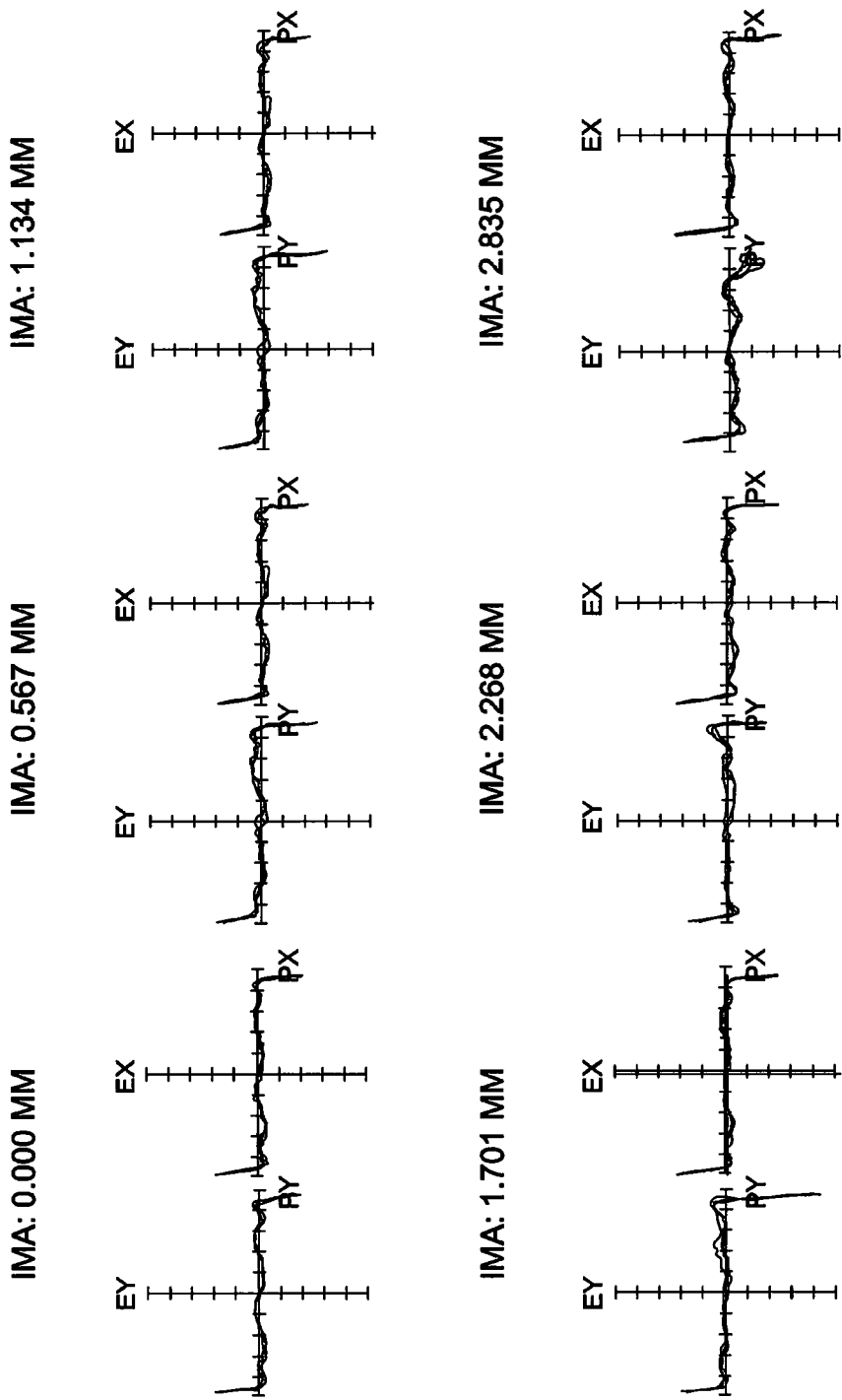
FIGS. 4-6 are graphs illustrating optical simulation results of a fixed focus lens.
Figures 5, 6:
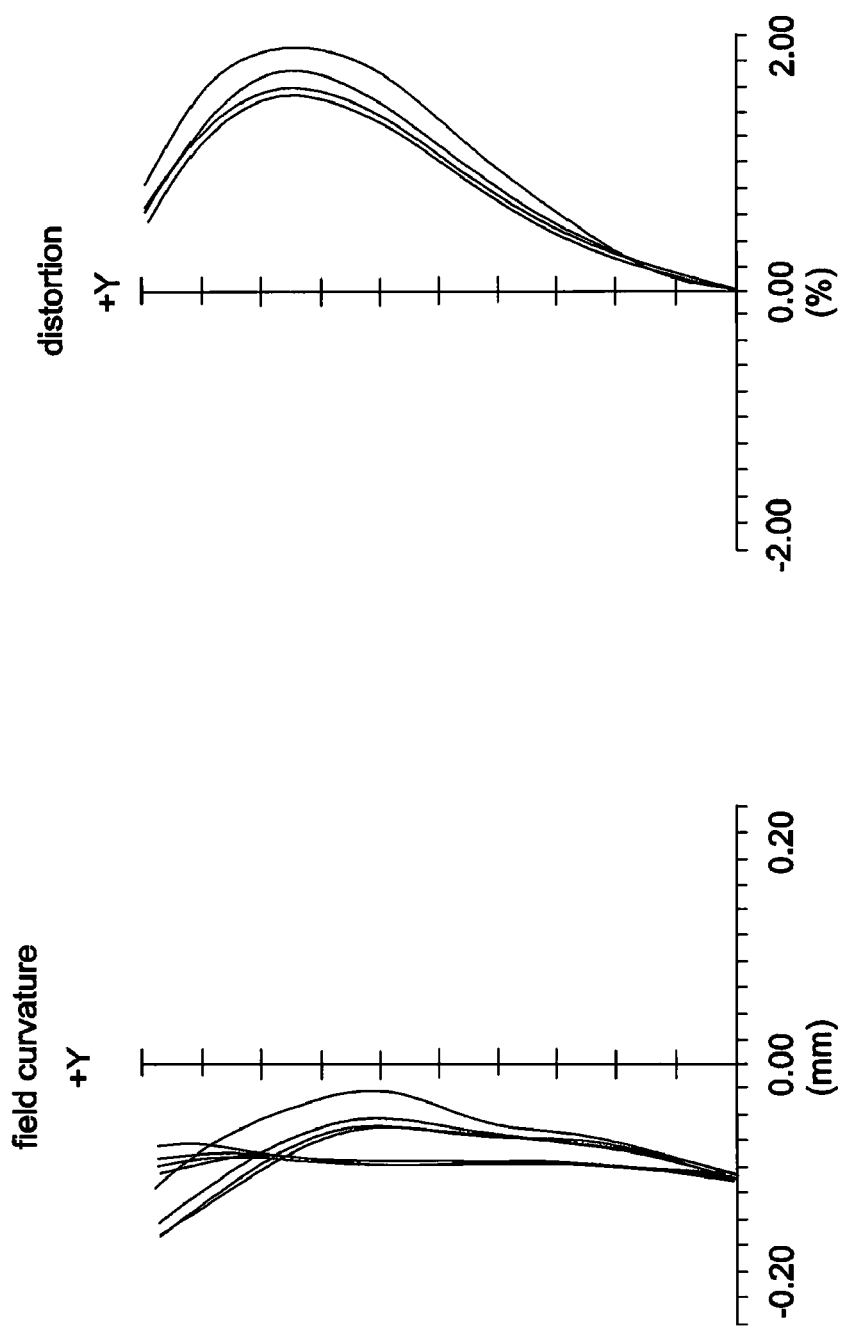

FIGS. 4-6 are graphs illustrating optical simulation results of the fixed focus lens 10. FIG. 4 shows a transverse ray fan plot, where the abscissa indicates the positions that light rays reach the aperture stop 12 and the ordinate indicates the positions that light rays reach the image plane 16. FIG. 5 illustrates an astigmatic field curvature, where the abscissa indicates the distance measured from the focal plane and the ordinate indicates different fields (from 0 to the maximum). Further, FIG. 6 illustrates a percent distortion of the fixed focus lens 10, where the abscissa indicates values of percent distortion, and the ordinate indicates different fields (from 0 to the maximum). As shown in FIGS. 4-6, it is seen the images formed by the fixed focus lens 10 have satisfactory quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed focus lens comprising, numbered in order of location from an object side to an image side, a first lens, a second lens, a third lens, and a fourth lens, the first lens being a biconvex lens with a positive refractive power, the second lens being a convex-concave lens with a negative refractive power, the third lens being a concave-convex lens with a positive refractive power, the fourth lens being an aspherical lens having a negative refractive power in the centre portion of the fourth lens and a positive refractive power at the periphery portion of the fourth lens, wherein the condition 1.0>|(1/r2−1/r1)|>0.6 is satisfied, where r1 denotes the radius of curvature of a front surface of the second lens facing the object side and r2 denotes the radius of curvature of a rear surface of the first lens facing the image side, and the condition 0.45>BFL/TTL>0.35 is satisfied, where BFL denotes the back focal length, the BFL is a distance from a rear surface of the fourth lens to an image plane at the image side, and TTL denotes the total length of the fixed focus lens.

2. The fixed focus lens as claimed in claim 1, wherein the condition fl/f>0.65 is satisfied, where fl denotes the focal length of the first lens and f denotes the focal length of the fixed focus lens.

3. The fixed focus lens as claimed in claim 1, wherein the first lens is made of plastic or glass.

4. The fixed focus lens as claimed in claim 1, wherein each of the second lens, the third lens, and the fourth lens is made of plastic.

5. The fixed focus lens as claimed in claim 1, further comprising an aperture stop disposed between the object side and the first lens.

6. The fixed focus lens as claimed in claim 1, further comprising an infrared filter disposed between the fourth lens and the image side.

7. The fixed focus lens as claimed in claim 1, wherein the radius of curvature of the rear surface of the first lens facing the image side is smaller than the radius of curvature of a front surface of the first lens facing the object side.

8. The fixed focus lens as claimed in claim 1, wherein an image plane is formed at the image side and the image plane is formed by a light-sensing device.

9. The fixed focus lens as claimed in claim 8, wherein the light-sensing device comprises a charge-coupled device image sensor or a complementary metal-oxide semiconductor image sensor.

10. The fixed focus lens as claimed in claim 1, wherein each of the first lens, the second lens, and the third lens is an aspherical lens.

* * * * *